Jan. 28, 1941. R. G. BOWER 2,229,765
CALCULATING MACHINE
Filed Nov. 16, 1935 4 Sheets-Sheet 1

INVENTOR
*Raymond G. Bower*
BY
ATTORNEYS

Jan. 28, 1941. R. G. BOWER 2,229,765
CALCULATING MACHINE
Filed Nov. 16, 1935 4 Sheets-Sheet 2

INVENTOR
Raymond G. Bower
BY
Davis, Macauley, May, Lindsey, & Smith
ATTORNEYS

Patented Jan. 28, 1941

2,229,765

UNITED STATES PATENT OFFICE 2,229,765

CALCULATING MACHINE

Raymond G. Bower, Bloomfield Hills, Mich., assignor to Burroughs Adding Machine Company, Detroit, Mich., a corporation of Michigan Application November 16, 1935, Serial No. 50,133

9 Claims. (Cl. 235—60)

This invention relates to a calculating machine, and it is particularly concerned with automatic means for conditioning the machine to perform predetermined functions in accordance with a program that can be readily changed by the operator.

It has been customary to have the paper carriage of a calculating machine actuate certain devices that condition the machine to perform different functions. This places a load on the carriage that varies in different positions of the carriage because, in some positions, there may be a large number of controls to be actuated, while, in other positions, very few, or no, controls need be moved. The movement of the carriage is slowed down by the load placed upon it. It would be possible, of course, to make the carriage spring strong enough to move the carriage rapidly under its heaviest load, but, then, the carriage would move too rapidly for the best operation when moving between columns where few or no controls had to be actuated. The net result is that, where the carriage has to actuate the controls, the carriage speed is limited by practical factors such as those mentioned.

The present invention is directed to a solution of this problem and it contemplates providing the paper carriage with a plurality of sets of indexing stops which do not actuate the mechanisms that control the functions of the machine but merely act as indexing stops. The set of stops that is active is then sensed, or "felt," by a mechanism which conditions the machine to perform the desired functions. In this manner the carriage has no noticeable load placed upon it, with the result that it can not only be speeded up in its operations, but it will also operate more satisfactorily The general object of the invention is to provide an improved automatic function control for calculating machines.

A more particular object is to provide an improved function control in which the paper carriage of a calculating machine carries an indexing means which is automatically sensed in the different columnar positions of the carriage to condition the machine for predetermined functions.

Other and more particular objects will appear from the following specification and drawings.

An embodiment of the invention is shown in the accompanying drawings in which.

General calculating machine features

The invention is shown applied to a machine having calculating mechanism mounted between two side plates 10 (Fig. 4), the mechanism not being shown in detail except for certain parts which will be described later.

Figures 1, 2:
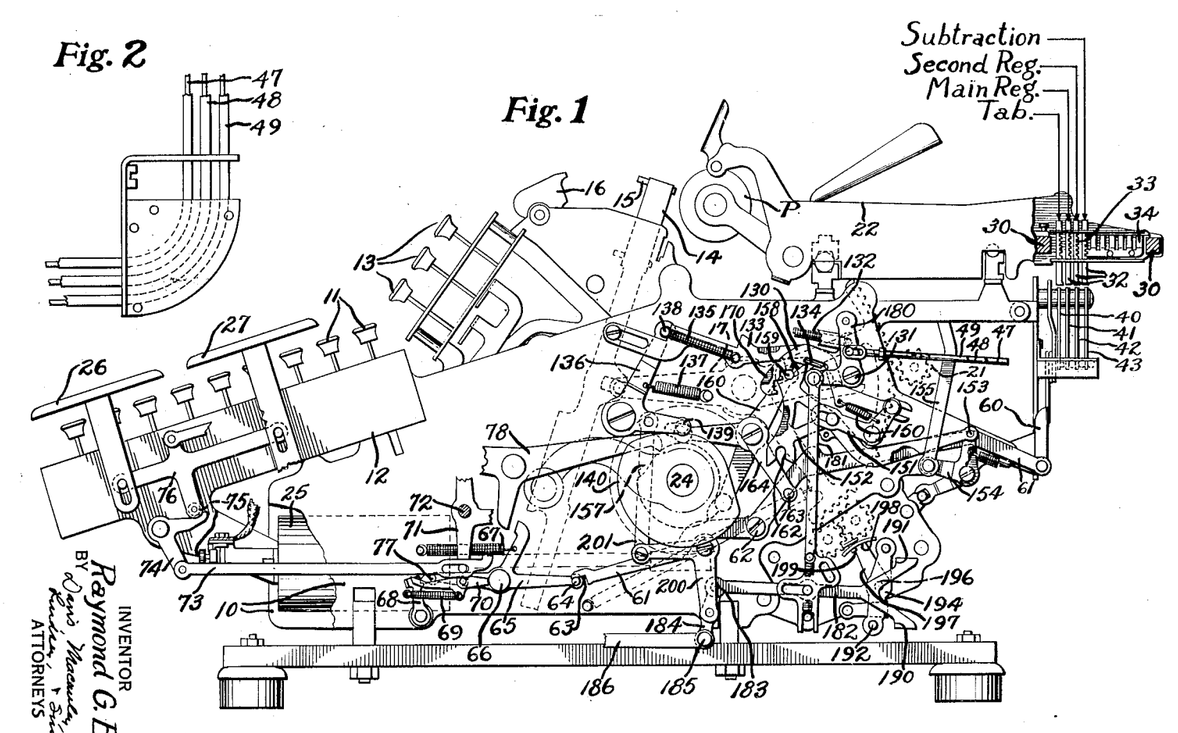
Figure 1 is a right side elevation of a machine with the invention applied thereto, the parts being shown in normal position.
Fig. 2 is a detail plan view of a portion of the controls showing the flexible cable construction.

The machine has a plurality of depressible amount keys 11 carried by a keyboard 12 and a series of control keys 13. The amount keys control the differential positioning of indexing bars 14 carrying type 15 on their upper ends adapted to be driven into engagement with paper held about a platen P by a printing mechanism of which a portion 16 is shown in Fig. 1.

Connected to the respective index bars near their centers are pivoted actuator racks 17 whose rear ends form toothed sectors with which the registers engage. The machine is provided with a main register 20, sometimes called a "crossfooter" which is capable of addition or subtraction. It comprises two sets of intermeshing pinions, one set being the add pinions and the other the subtract pinions. These sets of pinions are offset laterally with respect to one another so that, by shifting the register laterally, either set may be brought into active position relative to the actuator racks.

The machine also has another register 21 which is capable of addition only.

Suitable mechanism is provided for engaging and disengaging the registers and the actuator racks, portions of which will be presently described. The timing of the engagement and disengagement may be governed by the control keys, but is preferably automatically controlled as will be explained later.

Columnar-printing control means is provided for controlling the column in which printing shall occur on the paper held about the platen P. In the embodiment shown, this control is obtained by having the platen mounted on a traveling paper carriage 22 which moves laterally under the control of a tabulating mechanism that will later be described in detail. Normally, during each operation of the machine, the carriage is tabulated during the latter part of the cycle of machine operation, and after the printing mechanism has operated.

The machine is operated by means of a main drive shaft 24, which is given a single revolution to give the machine a cycle of machine operation. This drive shaft may be rotated by means of a hand crank (Fig. 1), or by means of a motor 25 controlled by the motor bars 26 and 27.

Function indexing means

The function indexing means comprises a plurality of sets of adjustable stops mounted on and movable with the paper carriage.

Figures 3, 6:
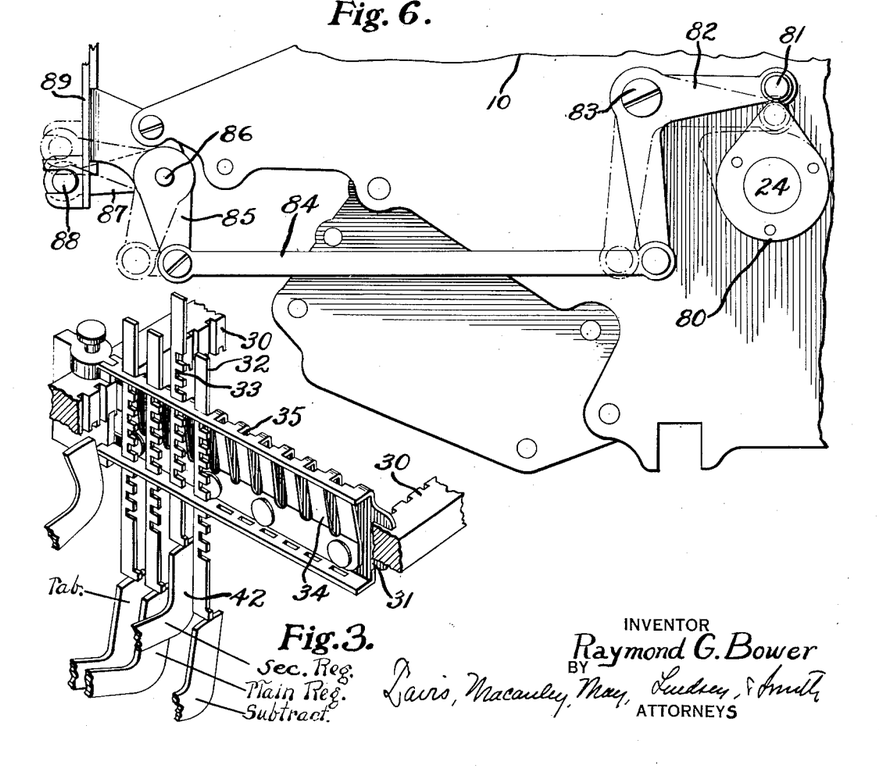
Fig. 3 is a perspective view of the indexing stops, from the rear.
Fig. 6 is a view similar to Fig. 5 showing a modified arrangement of the parts.

As shown in Figs. 1 and 3, the paper carriage is provided at its rear with two parallel rails 30 which are notched to support a plurality of removable cross pieces 31 each of which carries a set of differentially positionable stops 32. In the embodiment of the invention illustrated, four of these stops have been shown, but a greater number can be used if desired. The stops shown in Fig. 1 include one for controlling the skip tabulation, marked "Tab"; one for controlling the main register, marked "Main Reg."; one for controlling the second register, marked "Second Reg."; and one for controlling subtraction, marked "Subtraction." Each stop is provided with a plurality of notches 33 (Fig. 3) to permit it to be adjusted up and down in its respective supporting cross piece 31. The stops are urged toward the upper part of the cross piece by a comb-like spring 34 which holds the notches 33 in the narrow part of notches 35 in said cross piece. When it is desired to move a stop 32 up or down, its upper end is moved into the wider part of notch 35. The stop can then be moved up or down and released whereupon the spring 34 will throw it back to a latched position. The lower ends of the stops 32 are widened slightly to form abutments to receive the ends of sensing members, to be presently described.

This arrangement of indexing means is a very simple one, it places substantially no load upon the carriage, it permits the various stops to be readily adjusted, and it leaves the carriage free to be moved in either direction to any predetermined position without any resistance being offered by the indexing means. It is also very advantageous where the paper carriage is to be used with a machine having a typewriter section, because in such a machine the carriage often moves only the distance of a letter space which would not be enough to move controls actuated by the carriage.

It will be appreciated that, as the carriage moves to its different columnar positions, different sets of stops will be moved to active position.

As previously stated, the carriage does not actuate the parts that condition the machine to perform various functions. The carriage simply indexes the indexing means just described which is later sensed by a sensing means which will now be described.

Sensing means

The sensing means comprises, in general, a plurality of sensing members movable into engagement with the indexing stops, together with means for moving and controlling said members under different conditions.

Figure 4:
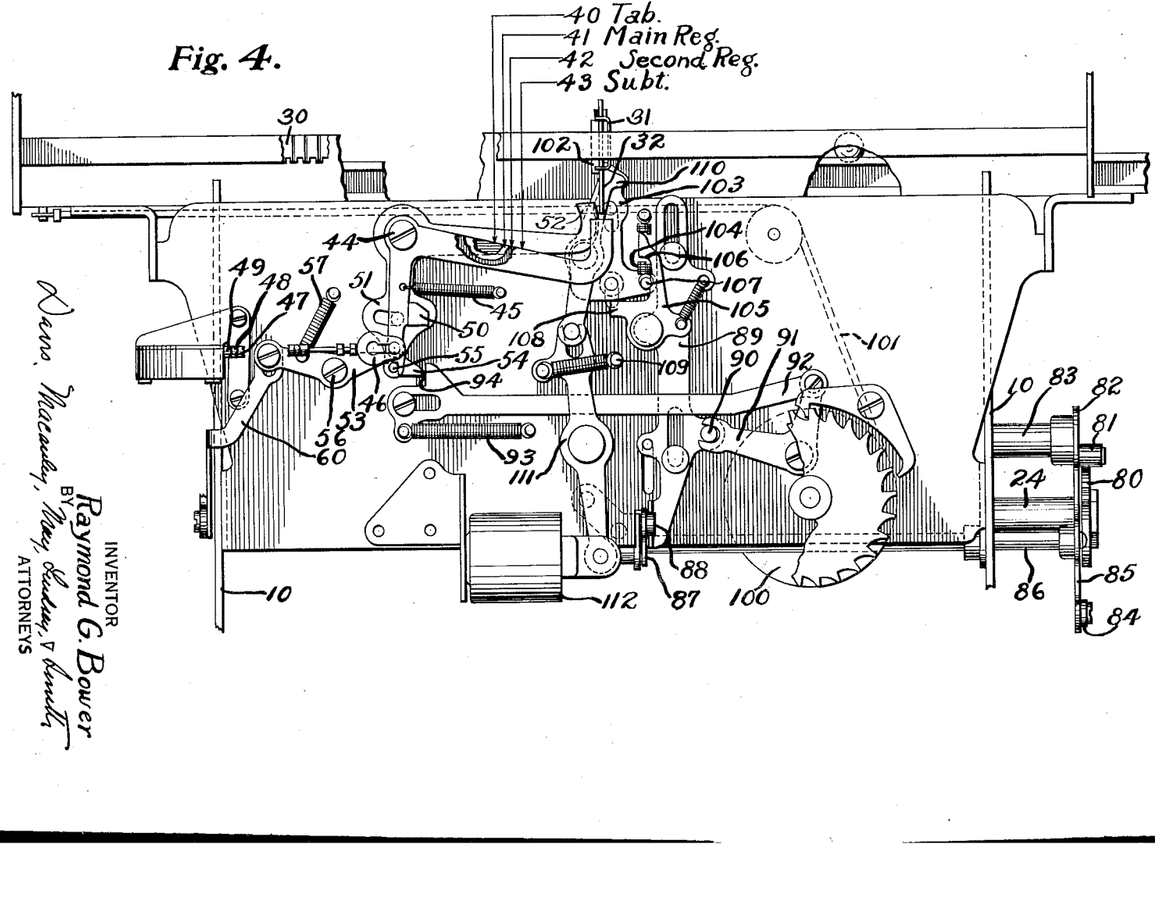
Fig. 4 is a rear elevation showing the parts associated with the present invention.

Referring to Figs. 1 and 4, a plurality of sensing members 40, 41, 42 and 43, are provided for cooperation with respective index stops 32. These sensing members are in the form of bell crank levers pivoted on a stud shaft 44 and urged counterclockwise by springs 45, there being a spring for each lever. The right-hand ends of the horizontal arms of the sensing members, as shown in Fig. 4, are turned upwardly and have abutment ends adapted to engage their respective stops 32. The other or downwardly extending arms, of the three sensing members 41, 42 and 43, are connected by releasable clips 46 to cables 47, 48 and 49 (Fig. 2) which extend through hollow tubes as shown in Fig. 2, to the forward part of the machine where they control the conditioning of the machine for various functions as will be described in more detail later. The sensing member 40 has a special connection which will also be explained later.

The sensing members are normally held out of engagement with the index stops 32 by means of a bail 50 which must be released in order to permit the sensing members to move to sensing position. In the hand operated type of machine, this release is accomplished automatically during the initial part of a cycle of machine operation and, in the motor operated type of machine, the release is preferably accomplished by means of the motor bar. The latter will be described first.

The bail 50 is carried by the downwardly extending arm 51 of a bell crank lever pivoted on the stud 44. The other arm of the bell crank extends horizontally and has an upturned end whose function will appear later. The bail is normally held in the position shown in Fig. 4 by a latch 53 having a hooked end 54 engaging over a stud 55 on the arm 51. The latch 53 is pivoted at 56 and urged clockwise to latching position, as viewed in Fig. 4, by a spring 57. The latch 53 may be released by depression of the motor bar through connections as follows:

A vertically movable slide 60 is connected to the left-hand end of the latch as shown in Fig. 4. This slide is connected at its lower end (Fig. 1) to the rear end of a long lever 61 pivoted at 62 and having a shoulder 63 on its forward end resting against a stud 64 on a three-armed lever 65 pivoted at 66 and urged counterclockwise by a spring 67. It will be noted that the urge of spring 67 tends to rock the lever 61 clockwise, which pulls slide 60 downward and tends to release the latch 53. However, the three-armed lever 65 cannot normally rock counterclockwise, owing to the fact that it is held against movement by a latch 68 having a shoulder engaging under the left-hand end of the forwardly extending arm of the three-arm lever, the latch 68 being urged clockwise in Figs. 1 and 7 by a spring 69. The latch 68 can be released by a pawl 70 on the lower end of the downwardly extending arm of another three-arm lever 71 pivoted at 72. The three-arm lever 71 is connected by a link 73 to a bell crank 74 having a cam arm positioned under a roller stud 75 on a rocker arm 76 that is rocked by depression of either of the motor bars 26 or 27. When either of these motor bars is depressed, the bell crank 74 is rocked clockwise, which pulls the link 73 forward and causes pawl 70 to release latch 68 whereupon the spring 67 rocks the three-armed lever 65 counterclockwise to release the latch 53 through the connections heretofore described, the released position being shown in Fig. 7. When the three-armed lever 65 moves, a stud 77 on it engages pawl 70 and holds it in disabled position. The three armed lever 65 is restored to normal by a crank 78 (Figs. 1 and 7) operated by one of the cams on the main drive shaft 24. The arrangement is such that the three-armed lever is restored during the machine cycle and latched in position by latch 68 even though the motor bar is held depressed.

Accordingly, when either motor bar is depressed, the latch 53 for the sensing means is released whereupon the sensing members are automatically moved by their springs to sensing position. Since this release is caused by depression of the motor bar, the sensing means moves to sensing position prior to operation of the machine, and the machine is thus conditioned to perform predetermined functions during the cycle of operation initiated by the motor bar.

Figure 5:
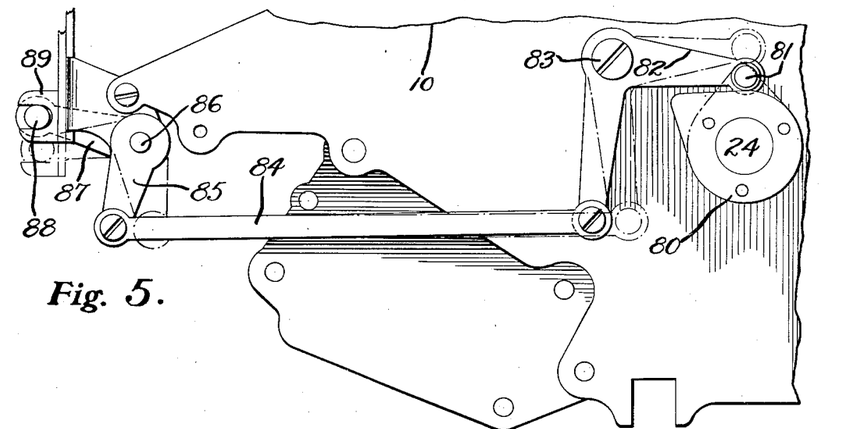
Fig. 5 is a detail view of a portion of the left side of the machine showing the parts in normal position.

The sensing means is automatically restored to normal position near the end of the cycle of machine operation as follows:

Referring to Fig. 5, which is a detail of the left side of the machine, the main drive shaft 24 is provided with a pointed cam 80 operating against a roller stud 81 on one arm of the bell crank lever 82 pivoted at 83. This cam normally occupies the full-line position shown in Fig. 5, and it makes one complete revolution during a cycle of machine operation, the revolution being in a counterclockwise direction in Fig. 5. Near the end of a cycle of operation the cam comes around to the dot-dash position of Fig. 5, whereupon it engages the roller stud 81 and rocks the bell crank 82 counterclockwise. The bell crank is connected by a link 84 to an arm 85 fixed to a shaft 86. This shaft extends toward the center of the machine, as shown in Fig. 4, where it has another arm 87 fixed to it. The latter has a stud and slot connection 88 with a vertically movable slide 89. The latter carries a stud 90 with which one end of a pivoted bell crank 91 engages. The other arm of this bell crank is connected to a slide 92 urged to the right, as viewed in Fig. 4, by a spring 93. Slide 92 has a shoulder 94 positioned to engage the stud 55 on the arm 51 carrying the bail 50. Near the end of a cycle of machine operation, when the bell crank 82 is rocked counterclockwise as viewed in Fig. 5, the link 84 is moved to the right which rocks the shaft 86 counterclockwise. This pulls the slide 89 downwardly and rocks the bell crank 91 counterclockwise, thereby moving the slide 92 to the left, whereupon the shoulder 94 engages the stud 55 and moves the bail 50 to the left to restore the sensing members to normal position out of engagement with the indexing stops 32.

In the modified form shown in Fig. 6, which may be used in a hand-operated machine, the arrangement is different, and the construction is such that the sensing means is released during the initial part of the cycle of machine operation.

Referring to Fig. 6, the cam 80 on the shaft 24 normally occupies the position there shown instead of the full-line position of Fig. 5. Thus the point of the cam normally holds the bell crank 82 and its connections in a position such that the bail 50 (Fig. 4) is held in the position there shown and the sensing members are held in position out of contact with the indexing stops. The latch 53 for the arm 51 supporting bail 50 is omitted as the parts are held in normal position by the parts just described.

As the shaft 24 starts to rotate counterclockwise during a cycle of operation initiated by a hand crank, the cam 80 immediately releases the bell crank 82 which thereupon moves to the dot-dash position, with the result that the sensing means is released immediately, and in plenty of time for it to sense the indexing means and condition the machine for the function it is to perform during the cycle of operation. Near the end of the cycle of machine operation, the pointed cam 80 comes around to the full-line position of Fig. 6 and rocks the bell crank 80 counterclockwise to restore the sensing means to normal position out of contact with the indexing stops.

Thus, it will be seen that the sensing means is automatically caused to be moved into engagement with the indexing means prior to operation of the calculating mechanism, to thereby condition the machine for predetermined functions. After the machine has operated, the sensing means is automatically restored to normal out of contact with the stops so as to leave the paper carriage free for lateral movement. There is no interference with the movement of the carriage because the sensing of the indexing stop takes place while the carriage is stationary. No load is placed upon the carriage, as the latter does not have to actuate the function conditioning means. It merely carries the very light indexing stops.

Before describing how the sensing means controls the conditioning of the machine with respect to the calculating functions the column printing control means will be explained, and its relation to the sensing means described.

*Columnar-printing control means*

The paper carriage is urged to the right, as viewed in Fig. 4, by a spring drum 100 connected by a flexible tape 101 to the carriage.

The carriage is provided with a plurality of tab stops 102 which do not function as do the indexing stops heretofore described. These stops are positioned according to the columnar positions of the carriage and, as the latter moves from left to right, Fig. 4, the stops are arrested by the end of a vertically movable slide 103 urged upward by a spring 104 to position to engage said tab stops. It will be recalled that, near the end of a cycle of machine operation, the vertical slide 89 is pulled downward. This slide carries a pawl 105 having a shouldered end 106 positioned to engage a stud 107 on the slide 103. Thus, near the end of a cycle of machine operation, the slide 103 is moved downward, thereby releasing the carriage, which moves to the right (Fig. 4). The slide 103 is held down only very momentarily because an extension 108 on the pawl 105 engages a stationary stud 109 and causes the pawl to be rocked clockwise to release slide 103. This slide, when released, moves upward under the urge of its spring 106 to catch the next tab stop to arrest the carriage in the next columnar position.

It is to be observed that the same slide 89 which restores the sensing means to normal also acts to release the tabulating mechanism. The position of the shouldered end 106 of the pawl 105 above stud 107 is such that the sensing means is always returned to normal before the tabulating mechanism is operated to release the carriage. Thus, disengagement of the sensing means and indexing stops is insured prior to any movement of the carriage.

The carriage is cushioned, as it moves to its tabulated positions, by a cushioned pawl 110 pivoted on slide 103 and connected by pin and slot connection to one end of a lever 111 whose other end is connected to a dash pot 112, the arrangement being such as to cushion the carriage as it is arrested. When the tabulating slide 103 is moved downward the cushioning pawl 110 moves with it and moves out of the path of stop 102 slightly before slide 103 releases said stop.

An interlock is also provided to prevent the carriage from being moved by hand while the sensing means is in engagement with the indexing stops. At the time such engagement occurs, the tabulating slide 103 is on one side of the tab stop 102 as shown in Fig. 4. As the sensing means moves upwardly the bell crank 51—52 carrying the bail 50 rocks counterclockwise. The right-hand end of the horizontal arm 52 of this bell crank is upturned, and this upturned end moves close to the left-hand side of the tab stop 102, with the result that the paper carriage cannot be moved by the operator in either direction.

*Automatic control of second register*

The second register is controlled by the second indexing stop from the right in Fig. 1. This stop has four notches, shown in Fig. 3, corresponding to "add," "non-add," "total" and "sub-total" position. The stop may be adjusted up or down to predetermine the function that is to be performed in the second register in the particular column of carriage where the stop is located.

The sensing member 42 which contacts the indexing stop for the second register is connected by the flexible cable 48 to a stepped indexing plate 130 (Figs. 1 and 8) pivoted at 131 and urged counterclockwise by a spring 132. This indexing plate is thus differentially positioned in accordance with the final position of the sensing member 42 which, in turn, is dependent upon the position of the indexing stop for the second register in the different columnar positions of the carriage.

The indexing plate 130 controls the differential position of a slide 133 having a lug 134 for engaging the shoulders on the plate. The slide 133 extends toward the front of the machine where it is connected through a spring 135 to one arm of a pivoted bell crank lever 136 urged clockwise by a spring 137. The bell crank lever carries a stud 138 adapted to engage a shoulder on the slide 133. The other arm of the bell crank carries a roller stud 139 engaging the edge of a cam 140 fixed to the main drive shaft 24. The parts are shown in normal position in Fig. 1.

When the machine is given a cycle of operation the main drive shaft 24 is given a single revolution clockwise from its Fig. 1 position. During the early part of the cycle the bell crank lever 136 is rocked counterclockwise and the bell crank, acting through the spring 135, moves the slide 133 to the left, the final position of the slide depending upon which of the stepped shoulders of the plate 130 is engaged by the lug 134. When the slide 133 is arrested the spring 135 yields to permit the bell crank 136 to complete its movement. In this manner the slide 133 is differentially positioned under the control of the stepped plate 130 which, in turn, is differentially positioned by the sensing member 42 that engages the indexing stop 32. The differential position of slide 133 determines the character of the engagement between the register 21 and the actuator racks.

Figures 7, 8:
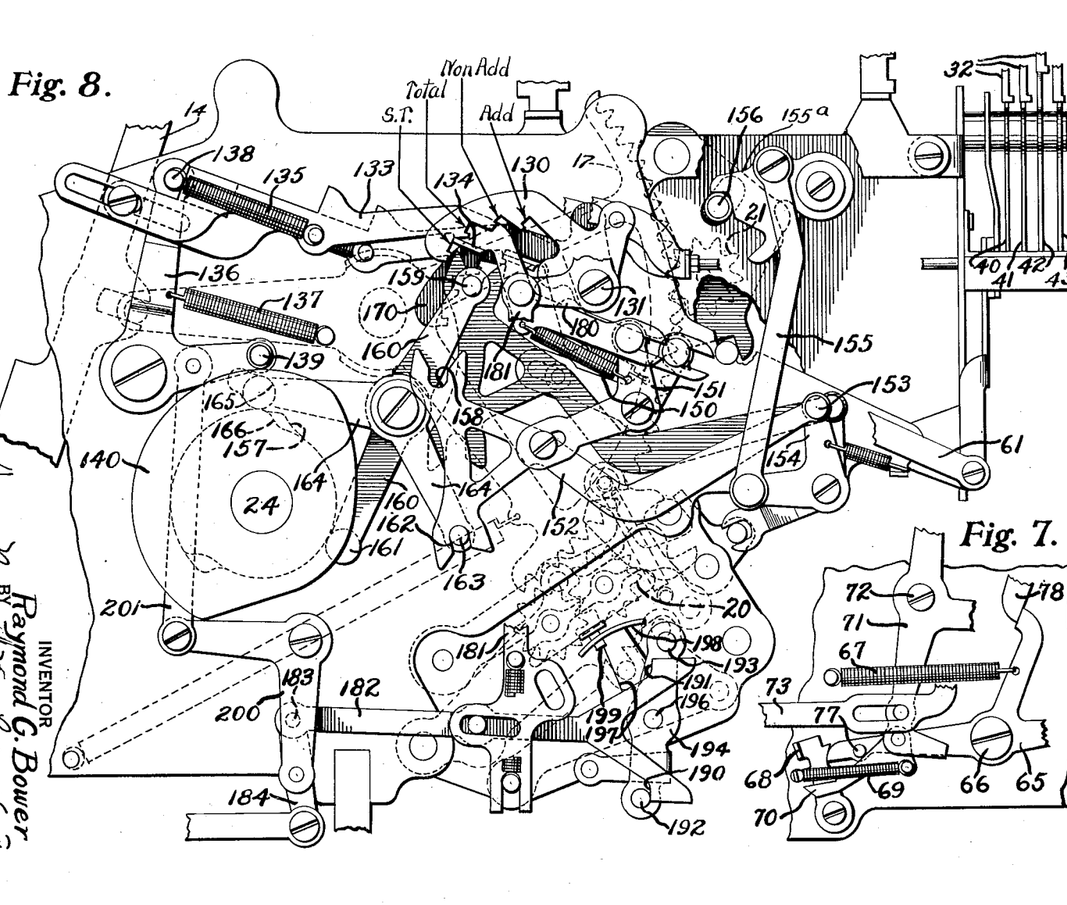
Fig. 7 is a detail view of some of the motor control parts.
Fig. 8 is an enlarged partial side elevation of the controls illustrated at the rear center of Fig. 1, the indexing means for one register being in subtotal position and that for the main register, or "crossfooter," being in add position, and this after the machine has been partially operated.

The parts are best shown in Fig. 8, but it must be kept in mind in connection with this figure that it shows the machine in partially operated condition, that is, operated to the extent that the sensing devices have been moved into engagement with the indexing means. The sensing member 42 that governs the register 21 is in sub-total position while the indexing member 41 for the main register is in add position. The main drive shaft has moved about a quarter of a revolution and the register 21 is in engagement with the actuators.

Referring to Fig. 8, the rear end of slide 133 is connected through a spring 150 to one arm of a pivoted bell crank lever 151. The other arm of this bell crank lever is connected through a stud and slot connection to a connecting member 152 pivoted at 153 to one arm of a bell crank lever 154. The latter is connected by a link 155 to a cam plate 155a which acts on stud 156 carried by the register frame to effect movement of the register 21 into and out of engagement with the actuator racks. The connecting member 152 has a notch 158 at its upper end adapted to be engaged by a stud 159 on the upper end of a lever 160. The lower end of this lever carries a roller stud 161 engaging the edge of a cam 157 fixed to the main drive shaft 24. As the main drive shaft is given a revolution during a cycle of operation of the machine, the lever 160 is rocked counterclockwise which moves the member 152 forward at a predetermined time during the cycle of operation to rock the bell crank 154 to move the register 21 into engagement with the racks. In Fig. 8, parts are shown with the drive shaft already moved sufficiently to rock the controlling members to cause the register 21 to be engaged with the actuators.

Assume now that the indexing stop 32 for the second register is in its lower position shown in Fig. 1, which is the "add" position. When the sensing means acts, it indexes the plate 130 to the position of Fig. 1 so that the "add" notch is in the path of the lug 134 on the slide 133. As the machine is given a cycle of operation, the slide 133 moves forwad until arrested by the "add" notch. This movement is very slight with the result that the member 152 is held in the position of Fig. 1 where its notch 158 is engaged by the stud 159 on lever 160. The shape of the cam 157 is such that the register 21 is allowed to remain out of mesh with the actuator racks during the first half of the cycle of machine operation after which the cam rocks the lever 160 counterclockwise to move member 152 forward to engage the register 21 with the racks so as to rotate the wheels in a clockwise direction as the racks are restored during the latter half of the cycle of machine operation. Thus, addition is performed.

If the index stop 32 should be in the "non-add" position the sensing means, when it operates, will then index the plate 130 so that the "non-add" shoulder is in the path of the lug 134. Then, during the cycle of machine operation, the slide 133 will be moved forward a short distance which will rock the member 152 slightly counterclockwise until its notch 158 is disengaged from the stud 159, thereby disabling the means for engaging the register with the actuator rack so that the latter remains out of engagement with said racks during the entire cycle of machine operation.

If the indexing stop 32 for the second register is in a "total" position, the sensing member, when operated, will move the plate 130 so that the "total" shoulder is in the path of the lug 134 on slide 133. Thus, as the machine is given a cycle of operation, the slide 133 is moved still farther forward, and to an extent that causes the member 152 to be moved so that a notch 162 in the lower edge of the member engages over a stud 163 on the right-hand arm of a bell crank lever 164. The other arm of this bell crank lever has a stud 165 on it that engages the edge of a cam 166 on the main drive shaft 24. The shape of the cam 166 is such that, during the early part of the cycle of machine operation, the bell crank 164 is rocked clockwise, thereby moving member 152 forward to cause the register 21 to engage the racks before they descend, thus providing for a total-taking operation. Near the end of the first half of the cycle of operation, the register is rocked out of engagement with the racks so that it will be clear and will not be actuated while the racks are returned to normal position.

If the indexing stop 32 for the second register is in "sub-total" position, the sensing means, when it operates, will move the indexing plate 130 to a position such that its "sub-total" notch is in the path of the lug 134 on the slide 133. The mechanism for controlling the register during the sub-total taking operation has not been illustrated in detail as the same is not considered necessary for an understanding of the present invention.

*Automatic control of main register*

The main register is controlled by the third indexing stop 32 from the rear as shown in Fig. 1 which stop also has various control positions.

The sensing member 41 for the main register is connected by the cable 47 to an indexing plate 170, Fig. 8, similar to the plate 130 heretofore described. A set of controls for the main register is provided similar to those already described for the multiple register. Since these controls are of the same character and since they operate in the same way, it has not been considered necessary to illustrate or describe them in detail, it being understood that they correspond to the controls for the second register heretofore described.

*Automatic control of subtraction*

As previously explained, the main register is capable of subtraction as well as addition. When subtraction is performed, the subtraction register pinions are positioned for engagement with the actuator racks instead of the add pinions, the change in position being obtained by sliding the register laterally.

When subtraction is to be performed in the main register, the indexing stop 32 which controls the engagement and disengagement of the main register with the rack should be in the "add" position so that the register will be engaged with the racks at the end of the first half of the machine cycle in order that the pinions may be rotated while the actuator racks are being returned to normal.

Automatic control for subtraction is then obtained through the right-hand indexing stop 32 in Fig. 1 which controls the position of the sensing member 43 (Fig. 4). The sensing member 43 is connected by a cable 49 to a bell crank 180 connected by a link 181 to an arm 182 pivoted at 183 to a rock arm 184 pivoted, in turn, at 185 to a member 186 which, for the purposes of the present invention, acts as a stationary member. The arm 182 has an "add" shoulder 190 and a "subtract" shoulder 191 on it which are adapted to engage respectively with studs 192 and 193 on a rocker arm 194 fixed to a shaft 196 (Fig. 8). This shaft has another arm 197 fixed to it carrying a cam 198 on its upper end engaging a pin 199 on the laterally slidable frame carrying the main register 20 so that, when the arm 197 is rocked, the register frame is moved laterally one way or another depending upon the direction in which said arm is moved.

The center of the rock arm 184 is connected to one arm of the bell crank lever 200 connected by a link 201 to the bell crank 136 which is rocked by the cam 140 on the main drive shaft 24. When the main drive shaft is given a revolution, the bell crank 136 is rocked counterclockwise near the beginning of a cycle of operation and this bell crank, acting through the link 201, serves to rock bell crank 200 clockwise and pull arm 182 forward. Thus, during each cycle of operation, the arm 182 having the "add" and "subtract" shoulders 190 and 191 is moved forward and returned rearwardly.

If the main register 20 is in add position, as shown in Fig. 1, and, if the arm 182 is in the position there shown, then, as said arm 182 is moved forwardly, it does not affect the position of the rock arm 194 and the register 20 remains in add position.

If, however, the "subtract" indexing stop 32 is in subtract position so that the sensing member 43 moves up slightly, the cable 49 is pulled to the rear and the bell crank 180 is rocked clockwise. This lifts the link 181 and the arm 182 upwardly so that the subtract shoulder 191 of the arm 182 is in the path of the stud 193. Then, during the initial part of the cycle of machine operation, the rock arm 194 is moved counterclockwise which causes the cam 198 to shift the main register laterally so that the subtract pinions are in active position. Then, when the register 20 is rocked into engagement with the racks at the end of the first half of the cycle of operation, the subtract pinions will engage the racks instead of the add pinions, so that subtraction will be performed instead of addition.

The several functions described as controlled by the automatic sensing means are typical functions controlled by the invention but it is to be understood that other functions of the machine can also be controlled. Provision is made for larger number of indexing stops on the carriage and additional sensing members can be added as desired. The addition of these controls places no added load on the carriage except for the very small weight of the indexing stops, which is negligible. At each columnar position of the carriage, the sensing means senses the indexing stops and the machine is automatically conditioned to perform predetermined functions in said column, depending upon the setting of the indexing stops.

It is to be understood that the construction shown is for purposes of illustration only and that variations may be made in it without departing from the spirit and scope of the invention as defined by the appended claims.

I claim:

1. A machine of the class described adapted to be conditioned to perform selected ones of a multiplicity of different functions including total the path of said indexing means and operable to sense said indexing means, a main actuating shaft and means actuated by said shaft at the beginning of a cycle for causing said sensing means to sense said indexing means and thereby condition one or more of said control elements of said machine for predetermined functions during said cycle.

9. A machine of the class described having means for giving it cycles of operation, a plurality of function control devices, a traveling paper carriage, indexing means on said carriage, said indexing means including a plurality of variably settable function indexing elements, a plurality of sensing devices normally out of the paths of said function indexing elements, and means operable under the control of said cycling means for causing said sensing devices to move into sensing cooperation with said indexing elements and condition said function control devices in accordance with the settings of the sensed indexing elements during a machine cycle.

RAYMOND G. BOWER.